United States Patent [19]

Feldman

[11] Patent Number: 5,457,999
[45] Date of Patent: Oct. 17, 1995

[54] METHOD AND APPARATUS FOR MEASUREMENT OF FORCES AND PRESSURES USING TENSIONED BELLOWS

[75] Inventor: Alexander I. Feldman, Redmond, Wash.

[73] Assignee: The Slope Inidcator Company, Inc., Seattle, Wash.

[21] Appl. No.: 170,367

[22] PCT Filed: May 5, 1992

[86] PCT No.: PCT/US92/03726

§ 371 Date: Jan. 5, 1994

§ 102(e) Date: Jan. 5, 1994

[87] PCT Pub. No.: WO93/22643

PCT Pub. Date: Nov. 11, 1993

Related U.S. Application Data

[63] Continuation-in-part of Ser. No. 538,884, Jun. 15, 1990, Pat. No. 5,115,675.

[51] Int. Cl.⁶ .................................................. G01L 7/00
[52] U.S. Cl. .................................................. 73/704; 73/729.1
[58] Field of Search .............................. 73/704, 703, 702, 73/580, 581, 716, 720, 729.1

[56] References Cited

U.S. PATENT DOCUMENTS

| | | | |
|---|---|---|---|
| 2,447,817 | 8/1948 | Rieber | 73/704 |
| 3,062,052 | 11/1962 | Kolb | 73/704 |
| 3,543,585 | 1/1965 | Brown | 73/704 |
| 3,638,496 | 2/1972 | King | 73/728 |
| 3,935,745 | 2/1976 | Jonell et al. | 73/398 R |
| 4,149,422 | 4/1979 | Olsen et al. | 73/704 |
| 4,255,973 | 3/1981 | Karplus | 73/704 |
| 4,311,053 | 1/1982 | Cucci | 73/704 |
| 4,379,226 | 4/1983 | Sichling et al. | 73/704 |
| 4,471,660 | 9/1984 | Bodge | 73/704 |
| 4,476,725 | 10/1984 | Chorel et al. | 73/704 |
| 4,938,068 | 7/1994 | Clements | 73/704 |
| 5,003,825 | 4/1991 | Lew | 73/704 |
| 5,036,715 | 8/1991 | Hanson | 73/704 |
| 5,115,675 | 5/1992 | Feldman et al. | 73/704 |

FOREIGN PATENT DOCUMENTS

| | | | |
|---|---|---|---|
| 1571450 | 6/1990 | U.S.S.R. | 73/704 |

*Primary Examiner*—Richard Chilcot
*Assistant Examiner*—Ronald L. Biegel
*Attorney, Agent, or Firm*—Stephen M. Evans; David L. Garrison

[57] ABSTRACT

A method and apparatus for measuring differences between forces, pressures, and combinations thereof. One or more force or pressure deformable members, preferably metal bellows, are internally connected by rigid linkage which is in turn connected to a component for translating force magnitude into corresponding electromagnetic signals. In an embodiment, the apparatus has a pressure chamber (40), an elastic vibrating member (50), an electromagnetic coil (60), a linkage (33), a rigid body (30), a body extension (35), and a bellows (22) defining in part a reference chamber (20). Bellows (22) is attached at bellows fixed end (23) to rigid body (30) and is deformable in response to a difference between a bellows internal reference pressure $P_0$ and any pressure $P_1$ external to bellows (22), such as in pressure chamber (40). Elastic vibrating member (50) is connected at a first end to linkage (33). Linkage (33) projects rigidly from an interior face of movable end (24). Vibrating member (50) is connected to linkage (33), and is connected to body extension (35).

14 Claims, 3 Drawing Sheets

METHOD AND APPARATUS FOR MEASUREMENT OF FORCES AND PRESSURES USING TENSIONED BELLOWS

This is a Continuation-in-Part of U.S. patent application Ser. No. 07/538,884 filed on Jun. 15, 1990, now U.S. Pat. No. 5,115,675, issued May 26, 1992.

TECHNICAL FIELD

The present invention relates to the field of force and pressure measurement instrumentation and devices, particularly to force and pressure transducers for force and pressure measurement by means of changes in tension in an elastic, vibrating member. More particularly, the invention relates to a method and apparatus having a pressure deformable member that is under tension when linked to the vibrating member and exposed to external pressure. The invention additionally relates to a method and apparatus having multiple pressure deformable members under tension, rigidly linked by an internal linkage, for the measurement of force or pressure differentials between two or more sources.

DESCRIPTION OF THE RELATED ART

Pressure or force transducers, as they are commonly called, are part of our everyday life. The most prevalent form of transducer is perhaps the telephone. It translates electrical energy into mechanical energy or sound and vice versa. Other examples of everyday transducers are thermometers, loudspeakers and microphones, phonograph cartridges, and even an automobile. Every transducer converts one form of energy to another.

The present invention is directed to the field of transducers, but more particularly to the field of precision force and pressure measuring transducers. The primary uses for devices designed to precisely measure forces or pressures are in construction, manufacturing, and research. These devices generally have three main identifiable components or assemblies: a force or pressure sensing assembly that receives or collects an applied force or pressure; a force translating assembly that applies the mechanical motion or reaction of the force or pressure sensing assembly to a component responsive thereto; and a transducer means that converts the mechanical energy of the responsive component into a desired form, usually electrical energy. Various devices may combine two or all assemblies, depending upon the application and design considerations.

In the field most applicable to the invention, there are two parameters that are commonly measured. One is fluid pressure and the other is mechanical force. The type of force sensing assembly that is used is usually dedicated to measuring forces of a particular type while selection of the type of force translating assembly or transducer is largely a matter of preference. Some applications may choose one form while others may choose a different form. In other words, design considerations largely choose the form of force translating assembly and form of transducer means and not the type of force (fluid or mechanical) being measured.

A predominant form of transducer in this field has been and continues to be the vibrating member transducer. By subjecting a thin vibrating member to tension and inducing it to vibrate, analysis of its frequency of vibration can inform an observer of the amount of tension in the member. In practice, these devices usually had a movable object which was responsive to externally applied forces to which one end of a thin metal wire was attached. The other end of the wire was attached to a rigid, immovable object. When a force was applied to the movable object, a corresponding increase or decrease in tension was imparted to the wire by way of a force translating assembly. A transducer means, usually comprising an electromagnetic coil, induced the wire to vibrate at its fundamental frequency and in turn, converted the mechanical oscillation into electrical signals that contained the needed frequency information.

To interpret these signals, it was necessary to first obtain the frequency of vibration of the member without an external force and then with an applied external force. By applying the well known formula for oscillatory motion of a vibrating wire, the change in tension of the vibrating member was determined. From knowledge of the change in tension of the wire and the physical configuration of the force sensing assembly, it was then determined the amount of force that was presented to the device.

The primary advantage of this method for determining force by means of a vibrating member was that the output signal was frequency based as opposed to amplitude based. Those persons skilled in the art will appreciate the significance of this form of output since frequency based information is not subject to signal degradation as easily as is amplitude based information. Moreover, the choice of a vibrating member transducer means as opposed to other transducer means such as resistance based strain gauges, afforded greater immunity to thermal variances which affect the accuracy of a transducer.

In the field of vibrating member transducers, the measurement of mechanical force has been relatively straight forward. The vibrating member was mechanically connected at one end to a movable object that was in turn connected to the object exhibiting a mechanical force. Since the force to be measured had an ultimate direction associated with it (either inherently or by means of dedicated linkage associated with the connecting assembly), transfer of the force to the vibrating member was not complex. However, when it was desired to measure fluid pressure i.e., gas or liquid pressure, it was necessary to construct a pressure sensing assembly that would convert the omnidirectional pressure exhibited by the fluid into a single directional vector that could then be translated to the vibrating member.

Early designs of vibrating member pressure transducers relied on the deflection of a precisely machined, pressure deformable diaphragms as the primary component of the pressure sensing assembly. In these devices, one end of a thin metal wire was attached to the internal portion of the diaphragm and the other end of the wire was attached to an immovable object such as the device's housing in such a manner as to bring the wire into substantial pre-tension.

To measure the pressure of a fluid or gas, the exterior of the device was exposed to the fluid or gas of pressure $p_1$ while the interior portion of the device was exposed to a pressure of $p_0$ where $p_0 \leq p_1$. The resulting inward deflection of the diaphragm caused a corresponding decrease in the tension of the pre-tensioned wire. An electromagnetic coil then caused the wire to vibrate, the resulting vibrations were converted into electrical signals, and the signals were then transmitted to an observer.

While accomplishing the goal of altering the tension of the vibrating member in response to a change in pressure, the use of the diaphragm presented a significant shortcoming in that the diaphragm's response to a pressure was non-linear beyond a small range of deflection in response to external pressure $p_1$. This undesirable condition was caused by the design constraints of using a pressure deformable diaphragm. For example, practical design considerations limited the linear axial motion of the diaphragm. Therefore, the usable pressure range was similarly limited. Moreover, because the pre-tension of the vibrating member was generally limited to approximately 25% of its yield strength for design considerations, the range of stress that could be removed from the member by deflection of the diaphragm was significantly less than 25% of the member's rated yield strength. Also, because the instrument's pressure measurement range was determined primarily by the thickness of the diaphragm, variations of a few thousands of an centimeter would cause pressure measurement ranges to vary by many kPa. A full discussion of the mechanics and limitations of this type of pressure transducer can be found in U.S. Pat. No. 4,938,068 issued to Clements on Jul. 3, 1990.

To solve these and other limitations associated with deformable diaphragms, a different pressure deformable member was proposed. In these newer devices, a pressure deformable bellows with a movable end was substituted for the diaphragm. The bellows provided the desirable feature of sensing and translating pressure or force into linear movement without appreciable absorption or loss of force.

In these devices, the bellows of the pressure sensing assembly was exposed internally to gas or fluid pressure $p_1$ thereby causing the bellows to expand or, in some instances, to contract (if the pressure external to the bellows i.e., $p_0$, was higher than that internal to the bellows i.e., $p_1$). Because the radial side wall sections of the bellows inherently resisted movement in any direction except for the axial direction, the applied internal pressure $p_1$ caused the bellows to move only in the axial direction. A reinforcing end cap often was placed on the movable end of the bellows to provide an attachment point for the force translating assembly.

The force translating assembly generally employed mechanically coupling the movable end or reinforcing end cap of the bellows either directly or indirectly to a vibrating member. The basic principle was the same as employed in the deformable diaphragm with the improvement being greater accuracy and range by using the bellows. These devices, while an improvement over the deformable diaphragms were not without drawbacks.

A known drawback of many bellows devices was the tendency of the bellows, especially bellows having a low spring rate, to exhibit non-linear characteristics when subject to mechanical compressive forces in its intended direction of motion. These non-linear characteristics occurred because of compression loading which resulted in buckling of the bellows. Buckling, in this sense, referred to the bellows' unintended lateral deflection and can be described by the Euler formula for long columns. Summarily stated, either an increase in mechanical compressive loading in a direction opposite to the axial extension of the bellows or a decrease in stiffness of the bellows will increase the susceptibility of the bellows to buckling until a critical condition is met—the Euler load—at which point the bellows can deflect uncontrollably in a lateral direction.

The aforementioned mechanical compressive loading occurs from one distinct source: the resultant opposite force to the applied pressure which is the mechanical loading upon the movable end cap by the force translating assembly. By definition, the pressure $p_1$ exerted by the fluid internal to the bellows encounters equal and opposite forces in all directions at equilibrium. This is but another way of stating Newton's third law. However, in a pressure sensing assembly that restricts the axial extension of the movable end of an internally pressurized bellows, the bellows is subjected to an additional resistive force along the axis of the bellows movement. In essence, the bellows are being compressed from the top and bottom and therefore susceptible to buckling. An example of this type of pressure transducer can be found in U.S. Pat. No. 3,638,496 issued to King on Feb. 1, 1972.

This drawback would not be as serious if the compressive load on the movable end were a point load parallel with the axis of the bellows, the point load was located on the central axis of the bellows, and the bellows were circumferentially uniform in spring rate. In practice however, tolerances are never this accurate. The consequence is that the bellows is more likely to move laterally or buckle when subject to a mechanical compression load and impart, at a minimum, non-linear characteristics to the system. At the extreme, such buckling can cause a complete failure.

A possible solution to the buckling phenomenon is to incorporate a stiffer bellow structure to increase rigidity. However, by doing so the performance and sensitivity of the device would be correspondingly reduced by the inherently increased resistance to axial movement.

Therefore, a need exists to either remove the buckling phenomenon from consideration by employing a bellows structure that would not be susceptible to buckling as defined by the Euler formula when measuring the fluid or gas, or by designing a device that utilizes a means for transforming the forces exerted by the gas or fluid into mechanical movement without the limitations associated with internally inflatable bellows. Either of these methods would significantly decrease the undesirable non-linear and potentially damaging characteristics of buckling.

The devices of the prior art also incorporated two distinct methods of altering the tension of the vibrating wire in response to changes in pressure: These devices either decreased the tension of a vibrating member in response to increased pressure $p_1$ or increased the tension of the vibrating member in response to increased pressure $p_1$. The first is commonly referred to as a pre-tensioned or pre-stressed member as it is in a tension state even when no external forces are present.

While decreasing a vibrating member's tension in response to increasing pressure avoids the compressive state bellows' drawback referred to above, a pre-tensioned member has its own limitations. A distinct and significant limitation is the member's tendency to exhibit mechanical creep and thermally induced drift. Creep is a phenomenon whereby a material, subject to stress over time, changes in dimension. In the case of a member under tension, as commonly used in the prior art, creep causes elongation of the member which reduces the deflection of the force sensing assembly. Correspondingly, the tension of the vibrating member decreases in response to creep. The absence of unintentional elongation of the vibrating member is critical to the accuracy of a device that relies on deflection of the force sensing assembly to establish pre-tension. Because creep changes the length of the vibrating member, a stable frequency for a constant force cannot be maintained over time.

Some devices have attempted to compensate for this problem by proposing relatively complex mechanisms for removing the applied force from the pressure translating assembly, observing a base frequency, then reapplying the force to be measured. An example of this technique can be found in U.S. Pat. No. 3,935,745 issued to Jonell et al. on Feb. 3, 1976. The technique essentially recalibrates the device to compensate for the effect of mechanical creep as well as other undesirable conditions. However, it does not decrease the effect of creep. Therefore, a need exists to decrease a vibrating member's susceptibility to creep without introducing comparatively complex recalibrating methods that do nothing to eliminate the cause, but only compensates for its effects.

The other method for altering the tension of a vibrating member has been to begin with a relatively un-tensioned vibrating member and increase its tension in response to an increase in external pressure. This method of varying tension in response to external pressure variations has been practiced in the prior art, but not in relation with the advantages or applications of the present invention. An example of this method is disclosed in U.S. Pat. No. 4,255,973 issued to Karplus on Mar. 17, 1981 and U.S. Pat. No. 4,938,068 issued to Clements on Jul. 3, 1990. However, many forms of this method of increasing a vibrating member's tension in response to increasing pressure require that the bellows of the pressure sensing assembly undergo mechanical compression loading and involve the limitations and drawbacks described above.

Another problem concerning vibrating member transducers has been the difficulty associated with attaching the commonly used thin metal wire to the various components of the device. This problem stems from the fact that the wire is typically 0.2286 mm (0.009 in) in diameter and smooth surfaced. The attachment problem is especially significant when the wire must be pre-tensioned. Traditional methods of attaching a wire within a pressure transducer involved compressing or swaging a small bore, steel tube over the ends of the wire to provide adequate gripping surfaces. Unfortunately, this process introduced undesirable side effects such as plastic deformation or slippage of the wire in the small bore, steel tubes.

To overcome these limitations, force translating assemblies (pre-tensioned or not) may employ elongate strips of material for use as the vibrating member. In these devices, the strip is clamped or welded to the attachment points with very little resulting disturbance of the vibrating member or its attachment points. See for example U.S. Pat. No. 4,914,962 issued to Clements on Apr. 10, 1990.

The prior art also discloses various attempts to measure the differential in pressure between two fluids. These devices primarily employed a dual inflatable bellows configuration or a pressure equalization chamber. The first category was specifically designed to measure two distinct pressure sources, $p_1$ and $p_2$, while the second category was generally designed to compensate for barometric or ambient pressure changes, $p_0$, thereby ensuring consistent source pressure readings i.e., gage pressure.

Relating to the first category, these devices commonly utilized multiple bellows, expansively responsive to increases in pressure i.e., $p_1$ and $p_2$. For example, one such device employed two internally inflatable bellows attached on their movable ends to a common, fulcrummed beam. To this beam, in turn, was attached one end of a vibrating member with the other end attached to the housing or base. An example of this device is illustrated in U.S. Pat. No. 4,149,422 issued to Olsen et al. on Apr. 17, 1979. This method represents a mechanical determination of pressure differential.

Relating to the second category, these devices generally utilized a single bellows structure enclosed by a rigid housing that defined a pressure chamber. For example, one such device employed an internally inflatable bellows attached on its movable end to a mechanical linkage assembly wherein the bellows and linkage assembly were housed in a pressure chamber. The difference in pressure between the internal bellows pressure $p_1$ and the pressure chamber housing pressure $p_0$ determined the extent of translation of the bellows and therefore the pressure differential $\Delta p$ between the two sources. Normally, such devices provide gage pressure information, although they may be adapted for other limited uses. A device employing this method is illustrated in U.S. Pat. No. 4,476,725, issued to Chorel et al. on Oct. 16, 1984. This method represents a non-mechanical determination of pressure differential.

Both categories of these pressure differential devices customarily suffered from the shortcomings inherent when utilizing bellow structures that are internally inflated by a pressure $p_1$ or $p_2$ and under an axial, compressive loading—buckling. Moreover, these devices were unable to measure forces that were purely mechanical in nature i.e., non-fluid forces. Therefore, a need exists to construct a device that can measure the differential in any force, fluid or mechanical, or in any combination thereof, and do so without the adverse effects of buckling.

DISCLOSURE OF THE INVENTION

Accordingly, it is an object of this invention to provide a method and apparatus for measuring changes in external forces or pressures by causing axial movement of a non-compression state, force or pressure deformable member.

It is also an object of this invention to provide for the simultaneous determination of a force and/or pressure differential between two or more input sources whether fluid, mechanical, or combinations thereof.

It is yet another object of the invention to rigidly connect two or more force or pressure deformable members and convert their movement into information representative of the force or pressure differential therebetween.

It is still another object of this invention to provide an apparatus as described above which connects the interior of a relatively free end of a force or pressure deformable member directly to a vibrating member.

It is a further object of the invention to provide a force translating mechanism for axially transmitting a force between a movable end of a force or pressure deformable member to a first end of a vibrating member, wherein the second end of the vibrating member is attached to the same rigid body to which the force or pressure deformable member is also attached.

It is yet another object of this invention to limit the undesirable effect of creep on the vibrating member.

It is also an object of this invention to utilize a vibrating member that will permit more effective and efficient means for attaching the vibrating member to the various components of the invention.

For the purpose of helping to meet these objectives, the disclosure of commonly owned, co-pending U.S. patent application Ser. No. 07/538,884 filed Jun. 15, 1990 is hereby incorporated by reference.

In one embodiment, the invention is comprised of an apparatus for and method of measuring the magnitude of some external pressure $p_1$ with respect to a reference pressure $p_0$ by applying the external pressure as directly and as completely and practically as possible through a pressure deformable member, such as a bellows, through a linkage, to a vibrating member which bears virtually all of the force resulting from the pressure differential $\Delta p$ between $p_1$ and $p_0$. In the apparatus and method of an embodiment of the invention, the magnitude of the difference between the external pressure and the reference pressure sets up a tensile stress in the vibrating member which causes a change in the resonant frequency at which the member vibrates. A transducer means located proximate to the vibrating member converts the vibratory motion into corresponding frequency based electrical signals. By measuring the difference between an initial frequency wherein the invention is subject to a known force or pressure (such as a no-load situation) and an unknown force or pressure, a value for the unknown force or pressure can be determined. Thus, the frequency based electrical signals correspond directly to a change in tension of the vibrating member as it responds to $\Delta p$ through the pressure deformable member and its associated connection to the vibrating member.

A method of an embodiment of the invention comprises the steps of: 1) exposing an external surface of a pressure chamber having an internal pressure $p_0$ to an external pressure $p_1$, where the reference chamber is preferably comprised of a bellows having a movable end movable in response to $\Delta p$ and a fixed end attached to a rigid body; 2) allowing the bellows to compress, thereby increasing tension in a vibrating member connected between the movable end and the rigid body; and 3) sensing electromagnetically the change in tension in the vibrating member by means of resonant frequency detection. In step 2) above, the bellows may be alternately allowed to expand, thereby decreasing tension in the vibrating member. The resonant frequency of the vibrating member also may be sensed by other methods and apparatus, for instance electrically sensing the change in capacitance in the member, the resistance, or optically sensing means either now known or later developed, without departing from the scope of the invention.

Another embodiment of the present invention comprises a unique apparatus for and method of measuring the differences in externally applied forces, whether mechanical in nature, fluid in nature, or combinations thereof. By rigidly linking force or pressure deformable members so that movement by one will result in a corresponding but volumetrically opposite movement by the other, the determination of force differentials is not limited to differences in internal and external fluid pressure, but is instead applicable to the measurement of differences between any forces.

In this embodiment, the pressure sensing assemblies (hereinafter more appropriately referred to as the force sensing assemblies) comprise force or pressure deformable members in the form of bellows that are in a continuous, substantially non-compressed state, thereby virtually eliminating the undesirable phenomenon of buckling. These force sensing assemblies are rigidly connected to one another by an internal linkage. This rigid connection provides the means whereby the invention mechanically differentiates applied forces. To this linkage is attached one end of a vibrating member. The other end of this member is attached to an immovable portion of the invention, preferably the housing. This vibrating member is oriented such that it is responsive to the axial movement of the linkage. A conventional electromagnetic transducer imparts vibration upon the vibrating member and converts the same into frequency based electrical signals representative of the force differential which are subsequently transmitted to a receiving apparatus. Those persons skilled in the art will realize that other means for convening the presented mechanical movement of the force sensing assembly exist and are contemplated by the inventors. Such other means include, but are not limited to piezoelectric, resistive, mechanical, or optical means for the force translating assembly.

A method of this embodiment comprises the steps of: 1) exposing the force sensing assemblies to the forces to be differentiated in such a manner so that the force of greater anticipated magnitude will cause an increase in the tension of the vibrating member; 2) allowing the force translating assembly which applies the force to the vibrating member to reach equilibrium in the presence of the applied forces; 3) imparting vibration upon the vibrating member and allowing it to vibrate at its resonant frequency; and 4) converting the vibrational motion of the vibrating member into frequency based electrical signals.

Some embodiments of the force translating assembly utilize a substantially non-pretensioned vibrating member for use with the transducer means. This configuration significantly reduces the effect of mechanical creep in addition to other deleterious effects associated with utilizing a vibrating member in a pre-tensioned state when not subject to external forces.

Embodiments of the force translating assembly also employ an elongate strip of ferrimagnetic material for use as the vibrating member, the use of which simplifies the transduction requirements, reduces difficulties associated with attachment of a vibrating member to various components of the invention, and increases the consistency of measurement ranges between instruments.

The various components of the invention, described in more detail below, are advantageously combined to afford the widest scope of measurement range with the greatest accuracy for devices of this nature. In the various embodiments, these components provide for devices with the above described characteristics in a small and durable package.

As discussed generally above, a principle purpose of preferred embodiments of this invention is to measure the difference between mechanical forces and/or fluid pressures. Depending upon the applications, this invention internally connects one or more bellows by means of a rigid linkage that is wholly contained in a protective enclosure. To this linkage is attached one end of a vibrating member with the other end being attached to an immovable portion of the apparatus housing. The vibrating member is positioned such that it is parallel or congruent to the axis of at least one bellows. Consequently, movement of the linkage in response to applied forces or pressures results in a direct increase or decrease in the tension of the vibrating member.

DETAILED DESCRIPTION OF THE INVENTION

Figures 1, 2:
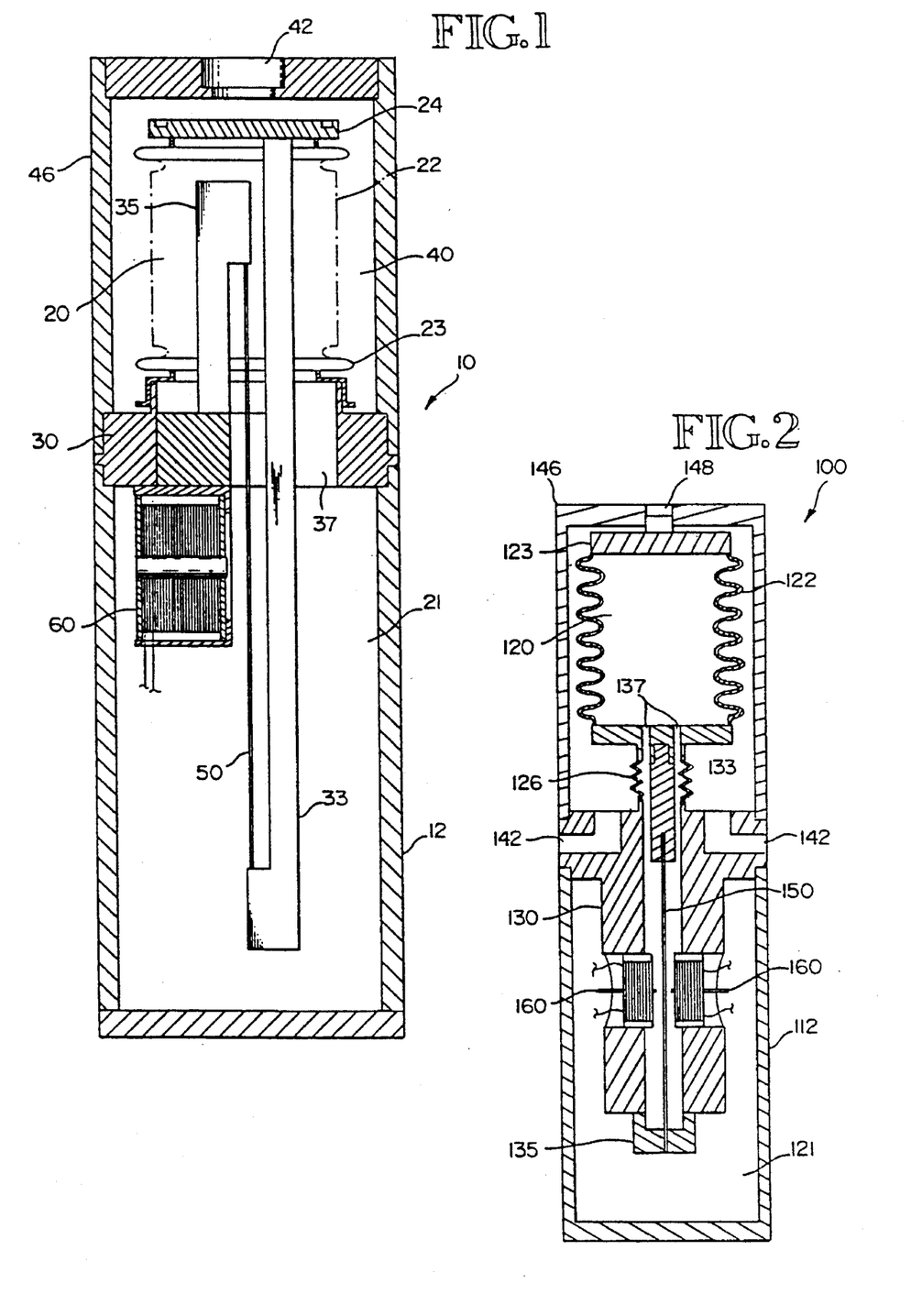
FIG. 1 illustrates a longitudinal cross section of a first embodiment of the invention having a single bellows for a pressure translating assembly.
FIG. 2 illustrates a longitudinal cross section of an embodiment alternate to that illustrated in FIG. 1.
Figure 3:
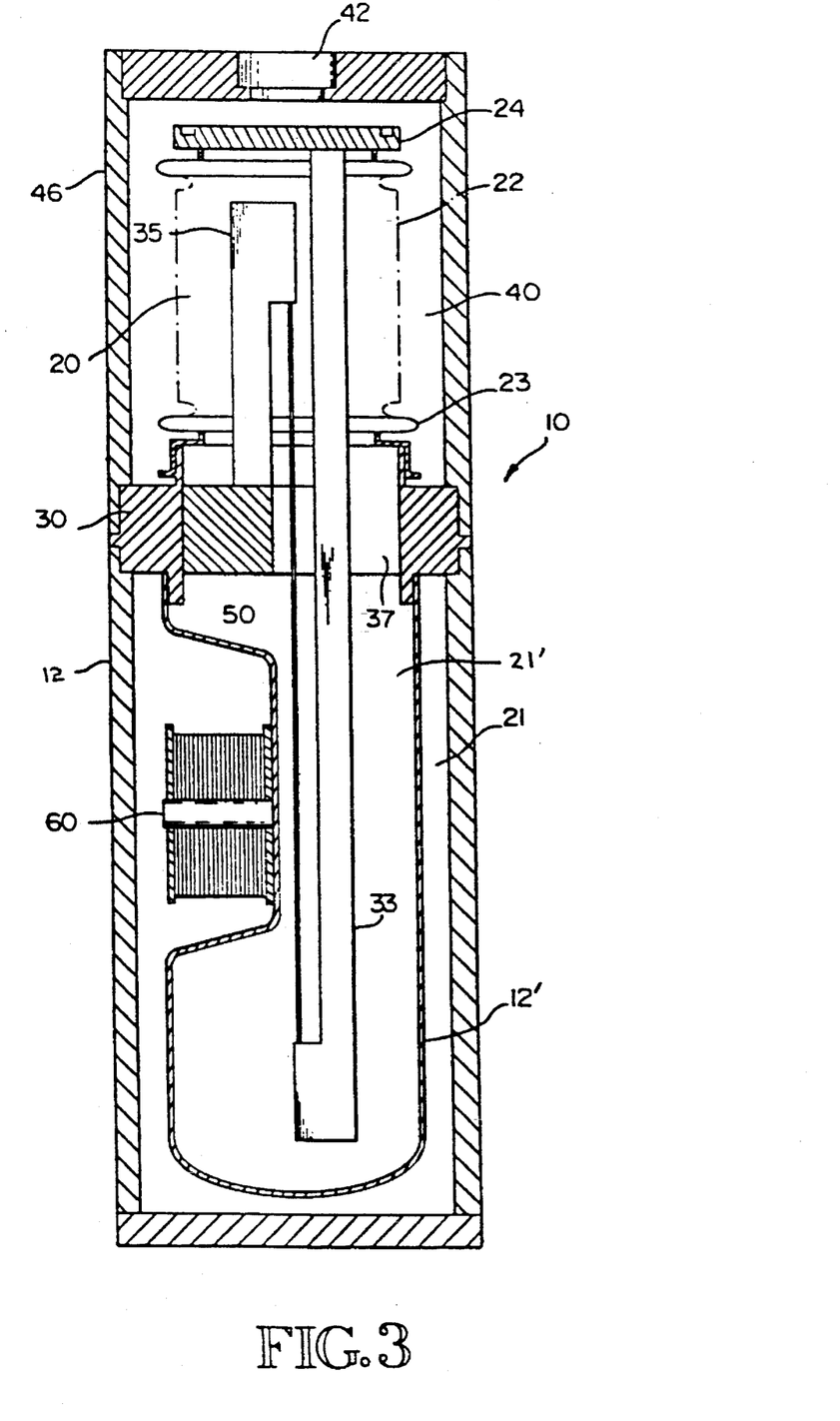
FIG. 3 illustrates a longitudinal cross section of a second embodiment of the invention having a force translating assembly alternate to that illustrated in FIG. 1.

Referring now to the drawings wherein like numbers indicate like parts, an embodiment of an apparatus for measuring pressure differentials and its alternate forms are illustrated in FIGS. 1, 2, and 3. In FIG. 1, apparatus 10 comprises three main parts: a force sensing assembly that further comprises a force or pressure deformable member or bellows 22, and movable end 24, a force translating assembly that further comprises linkage 33 and vibrating member 50; and a transducer means, preferably an electromagnetic coil.

Apparatus 10 is generally designed to measure the differential $\Delta p$ between applied pressures $p_1$ and $p_0$. Apparatus 10 is preferably constructed from stainless steel, unless otherwise indicated. For most applications, apparatus 10 has external measurements of between 1.91 to 3.80 cm (0.75 to 1.50 in) in diameter and 7.62 to 20.3 cm (3.00 to 8.00 in) in length. Turning now to the various elements, apparatus 10 has a reference chamber 20, an interior void 21 defined by rigid body 30 and housing 12, a vibrating member 50, and a electromagnetic coil 60. Reference chamber 20 is defined in part by formed metal bellows 22. Bellows 22 is attached at fixed end 23 to an immovable structure which is in this case rigid body 30, thereby fully defining reference chamber 20.

Through experimentation, it has been found that formed stainless steel bellows having dimensions of approximately 1.27 to 2.54 cm (0.75 to 1.00 in) in diameter and height with a functional stroke of 0.20 cm (0.08 in) function satisfactorily for most applications with housing 12 having the dimensions referred to above. In particular, Sylphon® bellows model number A00544-A03 manufactured by Robert Shaw Controls Co. have been found useful in inventions disclosed here within. Those persons skilled in the art will appreciate that other factors such as bellows resonance or induced harmonics will be additional considerations when choosing a bellows for use in the force sensing assembly. It should also be noted that the axial stiffness of any pressure deformable member should not exceed ½₀₀th the stiffness of vibrating member 50 to ensure the greatest possible efficiency of force transmission to vibrating member 50.

The aforementioned reference chamber 20 is also in fluid communication with internal void 21 via orifice 37. In this manner, reference chamber 20 and internal void 21 provide the reference pressure $p_0$ against which an external pressure $p_1$ will be presented for differentiation. Those persons skilled in the art will appreciate the ability to vary the internal or reference pressure $p_0$ by having only to access the relatively large housing 12. An option (not shown) is to place a valve in housing 12 so that the internal reference pressure $p_0$ can be more easily regulated depending upon the needs of the application.

Linkage 33, made of a material and cross section which is axially stiffer than vibrating member 50, preferably by a factor of 100 to 1, is attached to the interior side of movable end 24 of bellows 22. This attachment procedure should be done in a jig to ensure the most accurate alignment of vibrating member 50 to the axis of bellows 22 or a direction parallel thereto. Linkage 33 projects though orifice 37 in rigid body 30. A body extension 35 is rigidly and firmly attached, or integral, to rigid body 30 and may extend into reference chamber 20. Body extension 35 is preferably constructed from the same material as linkage 33 or rigid body 30 and is aligned with the same care and precision as was linkage 33 to movable end 24. For most applications, linkage 33 will be between 6.35 to 8.89 cm (2.50 to 3.50 in) in length and have a semi-circular cross section; and rigid body extension 35 will be between 0 and 3.81 cm (0 to 1.50 in) in length. These dimensions will be suitable for the embodiment described herein. However, those persons skilled in the art will realize that certain applications may require variations of these parameters. Attached to linkage 33 and rigid body extension 35 is vibrating member 50, preferably a thin strip of ferrimagnetic material. Vibrating member 50 will have sufficient tensile strength and elastic properties so that it may withstand tension forces in excess of those contemplated for the applications for which the device is designed.

Vibrating member 50 can be attached by spot welding, clamping, or by other means known to those persons skilled in the art. In the aforementioned configuration, vibrating member 50 is between 3.81 to 7.62 (1.50 to 3.00 in) in length. Again, this length is primarily determined by the intended range of measurement of the apparatus and the member's composition. It has been found that by slightly compressing bellows 22 during the attachment process, a slight pretension of vibrating member 50 results from the natural tendency of bellows 22 to return to its equilibrium position. This slight tension is sufficient to provide adequate tension to obtain a reference vibrating frequency when no external pressures are present.

By ensuring that vibrating member's major axis is coaxial or parallel to the axis of bellows 22, vibrating member 50 is subject to nearly the full tension loading imparted by the axial movement of movable end 24.

Electromagnetic coil 60 may be conveniently attached, by provision of a suitable mounting surface or sub-housing, to rigid body 30.

Pressure chamber enclosure 46 having a pressure port 42 defines pressure chamber 40 when sealingly attached to rigid body 30. Enclosure 46 is designed to prevent damage to the sensitive bellows 22 and related projecting components, but is not necessary for operation. Pressure port 42 can be any kind of opening and may be adapted for connection with a suitable fluid containing hose or conduit, or for inclusion of a filter.

FIG. 2 is an illustration of an embodiment alternate to that illustrated in FIG. 1. In this embodiment, apparatus 100 comprises generally all of the components shown in FIG. 1 except that linkage 133 is external to bellows 122. In this configuration, fixed end 123 of bellows 122 is threadably attached to rigid pressure chamber enclosure 146 which must be sealably attached to rigid body 130 in order for this embodiment to function properly. Movable end 124 has orifices 137 which provide for fluid communication with internal void 121. Linkage 133 is connected to movable end 124 at one end, and an end of vibrating member 150 at the other end. The free end of vibrating member 150 is connected to rigid body extension 135 which may be a separate element attached to rigid body 130 or may be integral therewith.

In this embodiment, a pair of electromagnetic coils 160 are mounted to rigid body 130 and are located proximate to vibrating member 150.

To provide a sealed means for fluid communication between reference chamber 120 and internal void 121, a flexible sleeve 126 is disclosed.

In general, components of the embodiment illustrated in FIG. 2 are dimensionally and compositionally the same as the embodiment illustrated in FIG. 1 with the exception of ports 137, flexible sleeve 126, and the shape of rigid body 130. The alternate geometry of bellows 122, linkage 133, and body extension 135, as compared to the corresponding parts of the embodiment illustrated in FIG. 1, allow a more direct linkage of the movable end of the bellows to the vibrating member. In this embodiment, however, pressure chamber enclosure 146 becomes in essence a rigid extension of body 130 insofar as fixed end 123 of bellows 122 must be rigidly mounted to enclosure 146.

Where, for reasons further detailed below, it is deemed desirable to have internal void 121 and reference chamber 120 in sealed fluid communication, flexible sleeve 126 sealably completes the passage between chamber 120 and void 121 via ports 137. In preferred embodiments, flexible sleeve 126 will be comprised of a formed metal bellows having as little stiffness as possible without collapse (low pressure devises may also employ pleated tubular rubber sleeves at some cost to linearity). The number and dimensions of ports 137 will be determined by design considerations well understood by those skilled in the art.

Body 130 has a shape which allows projection of rigid body 130 substantially into void 121, both for the purposes of mounting electromagnetic coils 160, and also for the purpose of spacing rigid body extension 135 an appropriate distance from the projecting end of linkage 133, therebetween to mount vibrating member 150.

Functionally analyzed, when a pressure $p_1$, greater than that contained within reference chamber 120 and internal void 121 ($p_0$) is presented to ports 142, movable end 124 axially moves towards fixed end 123 thereby causing an increase in tension of linkage 133. This increased tension is then applied to vibrating member 150. Electromagnetic coils 160 impart a resonant vibration upon vibrating member 150 and convert this oscillatory motion into appropriate frequency based electrical signals.

FIG. 3 illustrates an alternate embodiment of FIG. 1. FIG. 3 differs from FIG. 1 in that auxiliary chamber or internal void 21' is defined by an auxiliary housing 12', preferably constructed from an extruded stainless steel tube of material from which bellows 22 is typically made. Auxiliary housing 12' is formed so that one end is closed and one end is sealably attached to rigid body 30. When the present apparatus is constructed in this manner, reference chamber 20 is in fluid communication with auxiliary chamber or internal void 21' via internal orifice 37. This embodiment allows both auxiliary chamber or internal void 21' and reference chamber 20 to be evacuated and sealed during assembly prior to the installation of electromagnetic coil 60 and presents savings and improvements in manufacturing efficiency which will be appreciated by those skilled in the art.

As with previous embodiments, electromagnetic magnetic coil 60 can be mounted directly to auxiliary housing 12' in any well known manner that will place it proximate to vibrating member 50.

Figure 4:
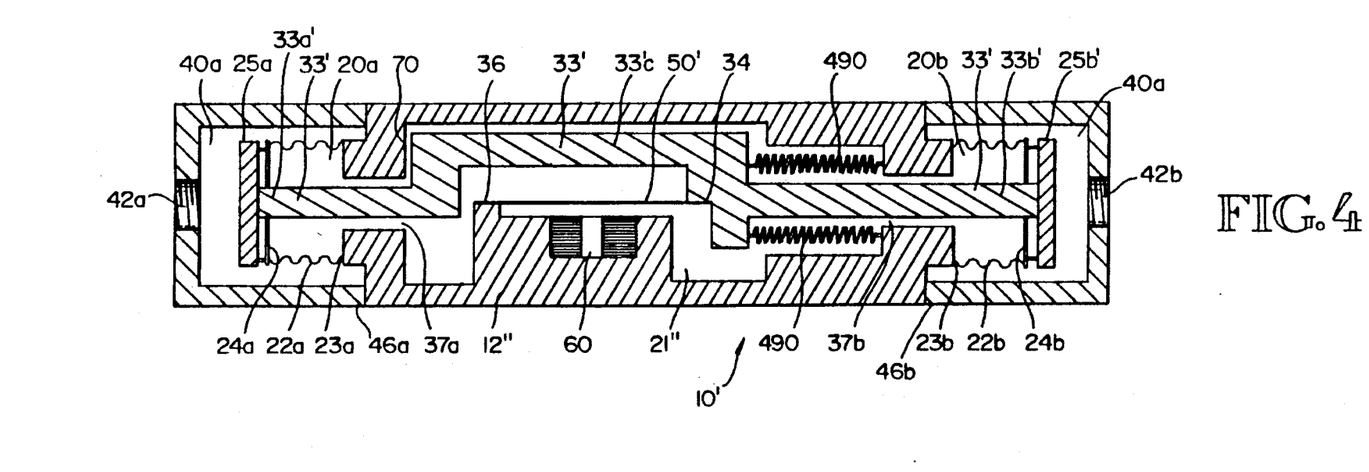
FIG. 4 illustrates a longitudinal cross section of a third embodiment of the invention having dual bellows for the force sensing assembly.

An apparatus for measuring multiple force and/or pressure differentials is illustrated in FIG. 4. Unless otherwise noted, elements of this embodiment are constructed from the same materials as with previous embodiments and are indicated as such by identifying them with similar numerals.

In this embodiment, apparatus 10' has a housing 12" defining an interior void 21" but has two internal, preferably circular, orifices 37a and 37b. Housing 12" is also preferably cylindrical in shape having a diameter of 1.91 to 5.08 cm (0.75 to 2.00 in) and an overall length of approximately 7.62 to 20.32 cm (3.00 to 8.00 in). Housing 12" is constructed preferably of stainless steel, chosen for its durability and resistance to external influences. Again, persons skilled in the art will understand that size, dimensions, and configurations are generally determined by operating conditions and design considerations.

Force or pressure deformable members in this embodiment take the form of bellows 22a and 22b which are sealingly attached to housing 12" at their respective fixed ends 23a and 23b so that interior orifices 37a and 37b are fully enclosed. This configuration thereby completely seals internal void 21". While bellows 22a and 22b are individually chosen for the required applications, as each application has an optimum performance criteria, the axial stiffness of any force or pressure deformable member should not exceed $\frac{1}{200}$th of the stiffness of vibrating member 50' to ensure the greatest possible efficiency of force transmission to vibrating member 50'.

Reinforcing end caps 25a and 25b may be attached to movable ends 24a and 24b of bellows 22a and 22b respectively, thereby providing a rigid surface for receiving mechanical loads. End caps 25a and 25b are preferably made of a material that is compressionally as stiff as linkage 33' described below.

To mechanically connect movable ends 24a and 24b of bellows 22a and 22b so that movement by one bellows translates to an opposite movement by the other bellows, linkage 33' is placed in rigid connection therebetween. Linkage 33' is chosen from material that is axially stiffer than vibrating member 50' on the order of 100 to 1. In this embodiment, linkage 33' will be 6.35 to 10.16 cm (2.50 to 4.00 in) in length and have a rectangular or semi-circular cross section.

Linkage 33' has two end sections 33'a and 33'b which are preferably coaxial to one another, and a mid section 33'c. End sections 33'a and 33'b are formed to fit within internal orifices 37a and 37b so that the least amount of translational resistance is created. Bushing or bearing surfaces (not shown) may also be incorporated, again depending upon conditions and design considerations. End section 33'a is attached to movable end 24a and end section 33'b is attached movable end 24b. As in previous embodiments, the aforementioned attachments are preferably done in a jig to assure correct and proper alignment of the axial center line of end sections 33'a and 33'b with the axial center line of movable ends 24a and 24b which are congruent with the center axis of bellows 22a and 22b. The alignment of these center lines is important for the full and proper transfer of applied forces to vibrating member 50' without deleterious lateral distortion of bellows 22a and 22b.

The transducer means for detecting external forces acting upon the force sensing assemblies and conveyed by the force translation assembly, comprises vibrating member 50' and electromagnetic coil 60. Vibrating member 50', preferably a strip of ferrimagnetic material, will have sufficient tensile strength and elastic properties so that it may withstand tension forces in excess of those contemplated for the applications to which the device is designed for. In this embodiment, vibrating member 50' has an length of 2.54 to 5.08 cm (1.00 to 2.00 in) and a sectional thickness of 0.0076 to 0.02 cm (0.003 to 0.008 in). Vibrating member 50' is attached at a housing attachment point 36 and a linkage attachment point 34 by spot welding, physical clamping, or other methods known in the art. As in the single bellows embodiment, by slightly compressing bellows 22b during the attachment process, a slight pretension of vibrating member 50' results from the natural tendency of bellows 22a and 22b to return to equilibrium, thus aiding in establishing a reference frequency when no external forces are present.

In applications where large force or pressures are to be measured e.g., greater than 7.18 kPa (150 lb. ft.$^{-2}$), a sufficient preload of vibrating member 50' is desirable to limit the effects of spurious signals from other elements of apparatus 10. Therefore, springs 490 may be employed to impart sufficient pretension upon vibrating member 50'. This pretension permits vibrating member 50' to have a higher no load vibration so that external and undesirable harmonics and spurious signals presented by, for example linkage 33' or bellows 22a and 22b, are not within the range of expected frequencies of vibration of vibrating member 50'. This configuration also minimizes non-linear characteristics associated with using bellows 22a and 22b to pretension vibrating member 50', such as thermal drift and creep. This preload of vibrating member is generally 10% of the working range minimum force or pressure of apparatus 10.

The resulting physical geometry of attaching vibrating member 50' at points 34 and 36 is so that translational movement by linkage 33' causes vibrating member 50' to be subject to only the difference in force between the two force sensing assemblies.

Figure 5:
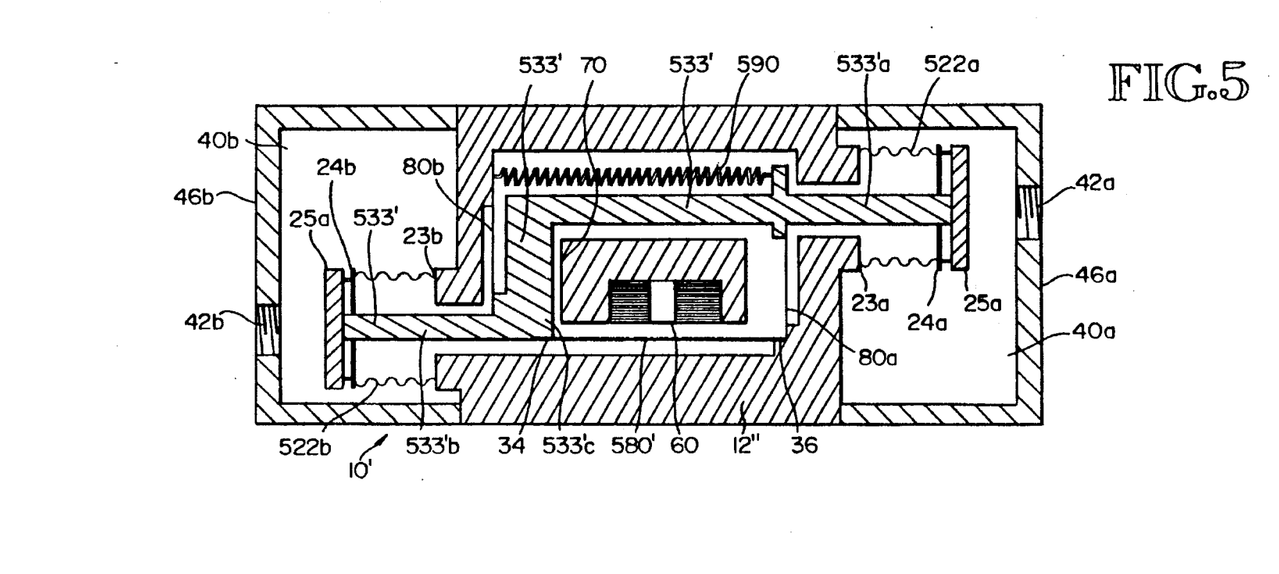
FIG. 5 illustrates a longitudinal cross section of an alternative embodiment to that illustrated in FIG. 4.

The orientation of vibrating member 50' should be such that its major axis is substantially coaxial or parallel with the axis of bellows 22a and 22b, and end sections 33'a and 33'b so that the tension in vibrating member 50' is equal to the difference in axial forces acting upon bellows 22a and 22b. Moreover, to make the operation of electromagnetic coil 60 more efficient, the surface of largest area of vibrating member 50' should face electromagnetic coil 60. Those persons skilled in the art will appreciate that any directional vector for vibrating member 50' relative to the directional vector of the axis of movable ends 24a and 24b is permissible provided that all non-parallel forces and torques can be balanced without laterally distorting the bellows. An example of an embodiment demonstrating an alternate geometry is illustrated in FIG. 5, discussed in more detail below.

Mid section 33'c of linkage 33' is offset to facilitate the rigid connection of linkage 33' to movable ends 33'a and 33'b, and the proper coaxial or parallel alignment of vibrating member 50'. This favorable geometry also provides a convenient means for physically preventing linkage 33' from over translating in a direction that may cause unintended harm to the force translating components, especially vibrating member 50'. This means for preventing directionally hazardous translation occurs when linkage 33' contacts housing 12 at surface 70.

Electromagnetic coil 60 should be mounted in close proximity to vibrating member 50' so that the magnetic field produced by 60 and the resulting interaction with the magnetic field by vibrating member 50' are of the most efficient nature. As was shown in previous embodiments of the invention, 60 need not be in the same internal space as vibrating member 50'.

The embodiment of FIG. 4 also provides for protective enclosures 46a and 46b. These enclosures define their respective chambers 40a and 40b. While not absolutely necessary, these enclosures protect the sensitive force sensing assemblies from damage and provide a convenient means for attaching accessories to the device via ports 42a and 42b.

FIG. 5 illustrates an embodiment alternate to that illustrated in FIG. 4. The components and principles are the same as illustrated in FIG. 4 with the exception that linkage end sections 533'a and 533'b, and bellows 522a and 522b are not coaxial but rather axially parallel, and restraining elements 80 and 82 are incorporated to prevent lateral distortion of bellows 522a and 522b which would result from unbalanced torques when forces are not coaxial. This configuration demonstrates that as long as the axis of bellows 522a and 522b, end sections 533'a and 533'b, and vibrating member 550' are parallel, the forces translated to vibrating member 550' closely represent the force and/or pressure differential.

Those persons skilled in the art will realize that numerous variations permitting parallel axis are possible and are contemplated by the inventor.

As in FIG. 4, pre-tensioning of vibrating member 550' greater than that imparted by bellows 522a and 522b may be desirable. In the embodiment shown in FIG. 5, spring 590 applies the force necessary to sufficiently pre-tensioning vibrating member 550' so as to minimize spurious signals and provide a clean signal throughout the intended range of measurement.

In all embodiments, it is preferable to evacuate the internal void in which the vibrating strip is housed. By reducing the pressure in the internal void to near zero atmospheres, corrosion of the strip can be more easily controlled. Moreover, variances in measured frequency are limited insofar as thermal drift is significantly reduced. In single bellows applications, evacuation of the internal void assists in the slight pre-tensioning of the vibrating member when no external forces are present and thus permits measurements prior to applying external pressures or forces.

Moreover, evacuation of the internal voids also insures that the internal portions of the bellows have reduced pressure in embodiments that provide for a sealed internal void that is in fluid communication with the internal portion of the bellows. In this manner, all pressures exposed to the force sensing assemblies will cause the bellows to exhibit non-compression state characteristics which is one of the objects of the invention.

The following applications of the various embodiments of the present invention are disclosed to illustrate its many uses. These examples are provided as a guide for uses and are not to be considered limitations of use or structure.

Measurement of the Pressure Differential between Two Fluids

The various embodiments of the present invention can be used to measure the pressure differential between two fluid sources. The embodiments represented by FIGS. 1, 2, and 3 are ideally suited for measuring an external pressure $p_1$, preferably as a dry gas, against a reference pressure $p_0$ contained within the apparatus. In these embodiments, pressure $p_1$ (where $p_1 \geq p_0$) is exposed to the exterior of the apparatus. The pressure causes the bellows to move axially towards the housing, thereby causing the corresponding movement of the internal linkage. The movement of the linkage is opposed by the increasing tension imparted upon the vibrating member. When the tension of the vibrating member is equal to the applied pressure $p_1$ acting upon the bellows, a measurement of the vibrating member's tension is performed. This measurement, when compared to a measurement taken when the instrument was subject to a pressure of known magnitude e.g., $p_1$ equal to standard pressure, represents the change in pressure.

If the embodiments illustrated in FIGS. 4 and 5 are to be used, a differential between two external pressures $p_1$ and $p_2$, either wet or dry, can be determined where $p_1$ is chosen by convention to be greater than $p_2$. Referring specifically to FIG. 4, chamber 40a is exposed to $p_1$ and chamber 40b is exposed to $P_2$. Internal void 21" has a pressure $p_0$, preferably zero atmospheres. At this point, the two force sensing assemblies reach equilibrium through addition of force vectors acting upon the rigid force translating assembly. Stated differently, the pressures existing at the respective force sensing assemblies are mechanically differentiated via the linkage.

The resulting pressure differential between the two sources applies a certain tension of the vibrating member. The tensioned member is then induced into resonant vibration by the adjacent electromagnetic coil causing the tensioned member vibrates at its resonant frequency. The electromagnetic coil then converts this mechanical motion into electrical signals. These signal are transmitted to a receiving unit that converts this electrical information into a useable form. It will be understood by those persons skilled in the art that alternative means exist for converting the difference in pressures. For example, transducer means for converting the movement of the force translating assembly may comprise capacitive, piezoelectric, or optical conversion; and the resulting information obtained from the transducer means may be transmitted by electrical, electromagnetic, or optical means.

Measurement of Force Differential between Two Mechanical Loads

When it is desired to measure the differential between two mechanical loads, the same apparatus and method is used as was described above for the embodiments illustrated in FIGS. 4 and 5 except that $p_1$ is now $f_1$ and $p_2$ is now $f_2$. However, the forces to be measured are either directly applied to the force sensing assemblies or to a spring assembly that is in continuous contact with the force sensing assemblies. Again, the ability of the invention to accept and differentiate these mechanical forces is made possible by the rigid interconnection of the bellows.

It is a significant feature of the invention that when the force sensing assemblies are subject to mechanical loads that derive from a common environment (such as ambient barometric pressure or submersion under water), such environments will not impair the ability of the invention to measure the force difference between the two mechanical loads.

Measurement of Force and Fluid Differential between a Fluid Pressure and a Mechanical Load When it is desired to measure the differential between a fluid pressure and a mechanical load, the apparatus illustrated in FIGS. 4 and 5 is used as was described in the preceding paragraphs with any corresponding modifications mentioned therein or such modifications as may be deemed necessary by those persons skilled in the art.

It is also possible to use the embodiments shown in FIGS. 1 and 3 wherein the mechanical load is connected to the bellows and a dry gas is introduced into the internal void and reference chamber.

Measurement of Linear Movement of an Object

Another use for the various embodiments, except that embodiment illustrated in FIG. 2, is to measure the strain or linear movement exhibited by an object. In this application, a compression spring assembly is placed in connection with the movable end or end cap of the force sensing assembly and the object to be measured so that changes in dimensions of the object to be measured will cause a corresponding change in tension of the vibrating member. By slightly compressing a spring that is in contact with an end cap of a bellows so that a slight pretension of the vibrating member is realized, two advantages are manifested: First, either linear expansion or contraction relative to the invention will be measured; and second, a greater magnitude of movement of the object can be measured due to the presence of a spring as compared to a rigid connecting rod. Of course, for extremely small anticipated movements by the object to be measured (0.0025 to 0.0051 cm or 0.001 to 0.002 in) a rigid connecting rod can be used. Measurement in relative increases or decreases in tension of the vibrating member can then be determined by analyzing the variation in frequency of the vibrating member using the force translating assembly and transducer means described above.

Measurement of Weight of an Object

Yet another use of the invention is to provide a convenient and highly accurate device for determining the weight of an object. Concerning the embodiments of FIGS. 1 and 3, the apparatus is located in such a way as to have the vibrating strip vertically oriented. A weight tray (with a suitable protrusion for extending into the port if a protective enclosure is being used) is brought to bear upon the force sensing assembly. A measurement is taken and recorded using the transducer means. The object to be weighed is then placed into the tray and another measurement is taken. By subtracting the initial measurement from the later, the weight of an object can be accurately determined.

If the embodiments as shown in FIGS. 4 and 5 are to be used, one additional consideration need be addressed: bellows 22a must be located above bellows 22b. In this manner, an object can be place on or in connection with bellows 22a or suspended from bellows 22b by suitable means.

INDUSTRIAL APPLICABILITY

The invention will find use in a variety of applications, particularly in the measurement and detection of force and pressure changes. An apparatus according to the invention will employ one or more force and/or pressure deformable members, most typically bellows, attached to the internal portion of said member(s) with a rigid linkage. Internal to the bellows and its associated void is an internal reference pressure set as close to absolute zero as practically possible so that any measured force or pressure, or change in external force or pressure, will be detected by the bellows as a change in axial movement without imparting mechanical compression loading upon said bellows.

Upon axial movement of the bellows, the aforementioned rigid linkage will cause the tension in a substantially untensioned vibrating member to increase in a linear fashion. By imparting oscillatory vibration to the vibrating member and detecting its frequency of vibration, the differential in force or pressure between two or more sources can be found.

The present invention will result in improved long term stability and linearity of response for greater accuracy of force and/or pressure measurement over a wider range. The present invention is also easy to manufacture and has a decreased failure rate compared to existing, similar devices.

What is claimed:

1. An apparatus for measuring the differences between fluid pressures, the differences between mechanical forces, and combinations thereof comprising:

(a) a housing defining an interior void, said housing having two, interior orifices;

(b) a first and second force or pressure deformable member, each deformable member being sealingly connected to said housing;

(c) a linkage having a midsection and a first and second end section, said first end section being connected to said first deformable member and said second end section being connected to said second deformable member whereby movement of either deformable member causes proportional movement of the other; and (d) a transducer means for converting the differential between forces presented proximate to said first and/or second deformable member into a signal.

2. The apparatus of claim 1 wherein said transducer means for converting the differential between forces comprises:

(a) an elongate vibrating member having two ends, one end of which is connected to said linkage and the other end of which is connected to a non-movable portion of said housing; and (b) a transducer located proximate to said elongate vibrating member for initiating and detecting vibration of said vibrating member.

3. The apparatus of claim 2 wherein said force or pressure deformable members are bellows and enclose said internal orifices of said housing.

4. The apparatus of claim 2 further comprising protective enclosures each having a port.

5. The apparatus of claim 4 wherein one port of one said protective enclosure is co-axial with one linkage end section.

6. The apparatus of claim 2 wherein a spring imparts tension upon said vibrating member.

7. The apparatus of claim 1 wherein said mid section of said linkage is offset.

8. The apparatus of claim 7 wherein said linkage further comprises torque movement restraining elements.

9. A method for measuring the differences between fluid pressures, the differences between mechanical forces, and combinations thereof comprising the steps of:

(a) exposing a first force or pressure deformable member to a force $f_1$, said first force or pressure deformable member being connected to a linkage;

(b) exposing a second force or pressure deformable member to a force $f_2$, said second force or pressure deformable member being connected to said linkage;

(c) allowing said linkage to move uni-directionally in response to exposure of force $f_2$; and (d) converting the difference between forces $f_1$ and $f_2$ into a signal.

10. The method of claim 9 wherein converting the difference between forces $f_1$ and $f_2$ into a signal further comprises the steps of:

(a) resisting the unidirectional motion of said linkage with a vibrating member having one end connected at a first end to said linkage and a second end connected to an immovable portion of a housing; and (b) sensing electromagnetically the change in state of the vibrating member by imparting oscillatory motion and generating a frequency based output signal.

11. The method of claim 9 wherein said force or pressure deformable members comprise bellows.

12. A method for measuring the difference between forces comprising the steps of:

(a) exposing a first bellows to a force $f_1$, said first bellows being sealingly connected to a housing and internally connected to a linkage;

(b) exposing a second bellows to a force $f_2$, said second bellows being sealingly connected to a housing and internally connected to said linkage;

(c) allowing said linkage to move, thereby changing a tension in a vibrating member;

(d) using transducer means to excite said vibrating member into resonance and converting said resonance into a frequency based signal.

13. The method of claim 12 wherein said vibrating member is connected at a first end to said linkage and at a second end to said housing.

14. An apparatus for measuring the difference between forces comprising:

(a) a housing defining an interior void, said housing having two interior orifices;

(b) two bellows, each bellows being sealingly connected to said housing and axially aligned with one of said two interior orifices;

(c) a linkage having an offset midsection and two end sections, each said end section being axially aligned with said bellows and internally connected thereto;

(d) a vibrating member connected to said linkage at a first end and connected to said housing at a second, and having the major axis of said vibrating member substantially parallel to the axis of said end sections;

(e) a spring connected at a first end to said linkage and connected at a second end to a non-moveable surface, thereby increasing tension in said vibrating member; and (f) a transducer located proximate to said vibrating member to impart oscillatory motion of said vibrating member and generate an output signed with a frequency proportioned to tensile stress within said vibrating member.

* * * * *

UNITED STATES PATENT AND TRADEMARK OFFICE
CERTIFICATE OF CORRECTION

PATENT NO.  : 5,457,999

DATED       : October 17, 1995

INVENTOR(S) : Clements

It is certified that error appears in the above-identified patent and that said Letters Patent is hereby corrected as shown below:

On the title page, item [75], delete Inventor "Alexander I. Feldman" and insert Inventor --David J. Clements--.

Signed and Sealed this

Thirtieth Day of January, 1996

Attest:

BRUCE LEHMAN

*Attesting Officer*                *Commissioner of Patents and Trademarks*